US00RE38448E

(19) United States
(12) Reissued Patent
Jurriëns

(10) Patent Number: US RE38,448 E
(45) Date of Reissued Patent: Mar. 2, 2004

(54) SAIL FOR A WIND-POWERED VEHICLE

(75) Inventor: Roger Jurriëns, L. G. Smith Boulevard 472, Malmok (AW)

(73) Assignee: Roger Jurriens, Malmok (AW)

(21) Appl. No.: 10/202,171

(22) PCT Filed: Jan. 7, 1998

(86) PCT No.: PCT/EP98/00035

§ 371 (c)(1),
(2), (4) Date: Mar. 4, 1999

(87) PCT Pub. No.: WO91/11361

PCT Pub. Date: Jul. 16, 1998

Related U.S. Patent Documents

Reissue of:
(64) Patent No.: 6,112,688
Issued: Sep. 5, 2000
Appl. No.: 09/142,189
Filed: Mar. 4, 1999

(30) Foreign Application Priority Data

Jan. 8, 1997 (DE) ..... 197 00 293

(51) Int. Cl.[7] ..... B63H 9/04
(52) U.S. Cl. ..... 114/102.29; 114/97; 114/102.1; 114/102.22; 114/102.33
(58) Field of Search ..... 114/89, 97, 102.1, 114/102.11–102.19, 102.2, 102.21–102.29, 102.3, 102.31–102.33, 104–108, 112

(56) References Cited

U.S. PATENT DOCUMENTS

| | | | | | |
|---|---|---|---|---|---|
| 4,563,970 | A | * | 1/1986 | Walker | 114/102.22 |
| 4,612,868 | A | * | 9/1986 | Reynolds | 114/102.33 |
| 4,688,506 | A | * | 8/1987 | van Breems | 114/104 |
| 4,699,073 | A | * | 10/1987 | Farneti | 114/102.25 |
| 4,706,591 | A | * | 11/1987 | Reynolds | 114/102.24 |
| 4,967,680 | A | * | 11/1990 | Dailey et al. | 114/104 |
| 5,272,996 | A | * | 12/1993 | Drexler | 114/102.15 |
| 5,279,241 | A | * | 1/1994 | Aguilera | 114/102.23 |
| 5,638,763 | A | * | 6/1997 | Kelsey | 114/105 |

FOREIGN PATENT DOCUMENTS

| | | | | | |
|---|---|---|---|---|---|
| DE | 2823418 | A | * | 12/1979 | B63H/9/06 |
| DE | 3217513 | A | * | 2/1983 | B63H/9/08 |
| DE | 3928761 | A1 | * | 3/1991 | B63B/15/00 |
| EP | 111987 | A2 | * | 6/1984 | B63H/9/06 |
| FR | 2422551 | A | * | 12/1979 | B63B/35/72 |
| FR | 2493797 | A | * | 5/1982 | B63B/35/72 |
| FR | 2530575 | A | * | 1/1984 | B63B/35/72 |
| FR | 2583015 | A1 | * | 12/1986 | B63B/35/79 |
| FR | 26664870 | | * | 7/1987 | 114/89 |
| FR | 2664870 | A | * | 1/1992 | B63B/35/79 |
| GB | 2162808 | A | * | 2/1986 | B63H/9/06 |
| GB | 2195111 | A | * | 3/1988 | B63H/9/10 |
| GB | 2235671 | A | * | 3/1991 | B63H/9/06 |
| WO | PCT/EP91/00158 | | * | 1/1991 | |
| WO | WO 9111361 | A | * | 8/1991 | B63H/09/04 |

* cited by examiner

*Primary Examiner*—S. Joseph Morano
*Assistant Examiner*—Ajay Vasudeva
(74) *Attorney, Agent, or Firm*—Sonnenschein Nath & Rosenthal LLP

(57) ABSTRACT

A sail for a wind powered vehicle such as a surfboard, sailing boat or the like is provided wherein a sail is connected along its front edge to a mast and wherein the [said] *sail* at its clew or at its lower edge is connected to a boom. The boom is connected in a hinged manner to the mast. At the free rear edge of the sail, at least one sail part is provided which is adjustable in the sail plane so that the overall area of the sail can be decreased or increased.

36 Claims, 2 Drawing Sheets

SAIL FOR A WIND-POWERED VEHICLE

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to a sail for a wind-powered vehicle such as surfboard, sailing boat or the like.

Sails for vehicles of the kind mentioned above are widely known and there are several embodiments regarding their size and form. According to the wind situation although with a single vehicle a sail of an adapted size may be used in order to reach a high velocity at the one hand, and to diminish the danger of capsizing as far as possible. It is usual for sailing boats to reef the sailing area of the sail when required, i.e. to move the total sail downwards in relation to the mast, and to roll or fold the lower area of the sail. It is usual for sails of surfboards to use several differently sized sails for a single surfboard which are used according to the wind situation. A change of the sail area during the usage, however, is difficult and impractical.

A surfing sail is known from WO 91/11361 comprising a base sail which at its front edge is connected to a mast which in a usual manner can be connected to a bifurcate boom, and at its clew is connected to the other end of the bifurcate boom, and an additional sail serving for the reefing operation. The additional sail has a triangle shape and is cut narrow and high, and is pivotally connected at its head in the upper area of the base sail adjacent to the rear edge thereof, and in the lower area approximately at the level of the bifurcate boom is provided with a guiding web which is arranged and bent such that it is pivoted at a circular path when pivoting the additional sail with the circular path in the radius thereof corresponding with the distance of the guiding web from the fastening point where the additional sail is secured at the base sail. The guiding web is displaceable in the length thereof such that the additional sail may be pivoted inwards and outwards during the surfing.

With this surfing sail, the sail area is variable, however, there is the great disadvantage in practical operation that when varying the sail area this is accomplished for practical reasons only in the lower area shortly above the bifurcate boom. Thereby, at each variation of the sail area the center of area and thereby the pressure point of the sail is displaced upwards which results in a more difficult handling of the sail by the surfing person. A further disadvantage is that, close to the peak of the sail, a pivoting joint is required which in this area of the sail requires a corresponding rigidity which may be only attained by designing the mast in the peak thereof relatively rigid. Furthermore applications, in this case the pivoting joint in the peak area of the mast have a very negative influence on the weight distribution. The handling of the sail is better if the mast and sail are lighter in the top area thereof. Because of the lever forces which are caused by relatively large mast lengths modern sails in particular surfing sails and masts are made especially light in the top area. During the last years almost exclusively modern masts are used which comprise a so called flex dynamic, i.e. a strongly flexible mast top which yields when the wind pressure raises suddenly, and which thereby automatically decreases the sail area exposed to the wind for a while. This flex dynamic in modern sails is additionally supported by a sail top which is stiffened by sail laths and which comprises a twist dynamic which corresponding with the flex dynamic of the mast deforms the sail top area when the flexible mast top yields, and thereby decreases the sail area without the sailor or surfer having to operate it himself. The use of a mast with flex dynamic, and also the use of a sail with twist dynamic are not possible with the sails known from WO 91/11361 because of the construction.

Furthermore a surfing sail is known from GB 2 235 671 A wherein an adjustable sail part may be displaced upwards and downwards in parallel with the mast. The displacement of the adjustable sail part is attained by cable control with at least one of the cables guided over the top of the mast, and a deflection roller positioned there for pulling the adjustable sail part upwards, and in parallel with the mast, and securing it there by this cable control when the maximal area of the sail is required. For receiving the resulting forces with the deflection roller at the mast top the mast has to have a large stability and rigidity up to its top which results therein that with this known surf sail no mast with a flex dynamic in its upper area may be used. If somebody uses this known sail at a modern mast with a flex dynamic the disadvantage would result that the mast top with the full area of sails would be too soft, and with a small area of sails would be too hard considering the twist dynamics explained above. A change of the front edge length cannot be transferred to modern sails with a twist dynamic.

SUMMARY OF THE INVENTION

It is the object of the present invention to provide a generic sail wherein in a simple fashion a variation of the sail area is possible without having a negative influence on the sail characteristic, and which is suitable for a use with modern flex dynamic masts with a flexible upper mast end area without any restrictions. Therein the sail is to be used with sailing boats and catamarans as well as with surfboards and other wind-powered vehicles.

According to the invention the object is attained with a generic sail characterized in that the adjustable sail part can be displaced substantially perpendicular to the free rear edge of the sail and/or substantially parallel to the boom.

Specifically, the sail of the present invention can be connected along its front edge to a mast wherein the sail at its clew or at or near its lower edge can be connected to a boom which is connected in a hinged manner to the mast. In the region of its free rear edge, the sail comprises at least one sail part which is adjustable in the sail plane by moving the sail part laterally in its adjusting direction. As a result, the total surface area of the sail can be decreased by moving the sail part towards the mast or the total area of the sail can be increased by moving the sail part away from the mast.

According to the invention it is advantageously provided to decrease or increase the sail in a simple fashion and even during the use of the associated vehicle in order to adapt the sail area to the wind conditions met. As only a displacement of the displaceable sail part is required for varying the sail area the handling is very simple which makes the new sail usable in particular for surfboards. As the displacing direction of the adjustable sail part substantially extends perpendicular to the free edge of the sail, or in parallel with the boom, respectively, which is substantially in horizontal direction the largest relative area variation of the sail may be attained with relatively small displacement distances. According to the invention advantageously the length of the front edge of the sail remains unchanged such that without any problems a flex dynamic mast, e.g. of carbon material may be used wherein the flex dynamic thereof is unchanged by the embodiment of the sail with an adjustable size. Furthermore the sail area, when adjusting the adjustable sail part, is changed only at the level of the bifurcate boom but for practical reasons is uniformly decreased or increased across the total altitude of the sail and the pressure point of the sail is only slightly displaced backwards or forwards in horizontal direction but in no case upwards or downwards such that the sail characteristic is almost unchanged which is important for handling the sail. Simultaneously, the sail top area remains unchanged which is so important for the flex dynamic and twist dynamic. A sail wherein the pressure point would be displaced upwards when increasing the sail area would require larger holding forces when compared with a sail with a lower sail pressure point which is very disadvantageous in particular in critical situations e.g. when turning the boat or in gust winds because the sail would not perform in a way the sailor or surfer is used to. This disadvantage is completely avoided with the sail according to the invention.

Furthermore it is proposed that in the sail several guiding profiles are arranged in parallel with each other, extending in the displacing direction, and simultaneously serving as sail laths, and that in the guiding profiles several displacing webs are guided which are connected to the displaceable sail part. By this construction it is attained that the displaceable sail part at the one hand may be displaced with small effort, and that at the other hand the sail in total and the displaceable sail part in particular are sufficiently form stable as such and perform as an integral sail when used.

In order not to limit the size of the adjustable sail part to an area above the boom, in particular with a surfing sail, and in order to use the boom for the displacement of the adjustable sail part is proposed that the boom substantially extends in parallel with the guiding profile, and is designed variable in length in its end area facing away from the mast. Bifurcated booms which are variable in length are known especially for surfboard sails, however, only in connection with several sails, each with a firm sail area.

Furthermore it is proposed that in the upper end area of the sail at least one sail lath with a firm length is provided, and that the adjustable sail part extends upwards to the first guiding profile as counted from upwards down. In this way the upper end area of the sail is not dependent from the position of the adjustable sail part in size thereof. This results in the advantage that when using a mast with flex dynamic, i.e. with an especially flexible upper end area the cooperation of the upper sail area with twist dynamic and the flexible mast end is not impaired. Thereby the sail will react independent from the present position of the adjustable sail part when the wind suddenly freshes-up in a way which is used to the sailor or surfer such that the handling of the sail is not impaired.

In an embodiment, the present invention provides a sail assembly for attachment to a mast. The sail assembly comprises a sail comprising a front edge, a rear edge and a clew. The front edge of the sail is connected to the mast. The clew is connected to a boom. The boom is hingedly connected to the mast. The sail defines a sail plane having a total area. The rear edge of the sail comprises at least one adjustable sail part which is adjustable in the sail plane by way of adjusting the longitudinal position of the adjustable sail part in a first adjusting direction substantially parallel to the [boom] *lath* and towards the mast wherein the area of the sail plane is decreased and by adjusting the lateral position of the adjustable sail part in a second adjusting direction substantially parallel to the boom and away from the mast wherein the area of the sail plane is increased.

In an embodiment, the sail comprises a plurality of guiding profiles disposed parallel to each other [and the boom] and extending along the sail in the adjusting direction. The adjustable sail part comprising a plurality of displacing webs disposed parallel to each other [and the boom] and extending along the adjustable sail part in the adjusting directions. The guiding profiles serving as sail laths. Each guiding profile accommodating at least one displacing web.

In an embodiment, the boom comprises an extendable rear end for increasing the length of the boom along the second adjusting direction.

In an embodiment, the sail further comprises an upper end area. The upper end area of the sail comprises at least one sail lath. The plurality of guiding profiles further comprising an uppermost guiding profile disposed below the sail lath of the upper end area and below the upper end area. The adjustable sail part extending upwards to the uppermost guiding profile.

In an embodiment, each guiding profile accommodates two displacing webs. Each guiding profile comprises a cross beam disposed between two opposing end sections. The cross beam is disposed generally perpendicular to the sail plane and to the end sections. The end sections are bent towards each other and from two profiled longitudinal slots with a cross beam disposed therebetween. Each profiled longitudinal slot accommodates one of the displacing webs of the adjustable sail part.

In an embodiment, the adjustable sail part comprises a rear edge and the displacing webs of the adjustable sail part are arranged in pairs. Each pair of displacing webs is accommodated in one of the guiding profiles on opposing sides of the cross beam. Each pair of displacing webs is connected to one another at the rear edge of the adjustable sail part.

In an embodiment, the guiding profiles comprise a T-shaped cross section with a cross beam that extends perpendicular to the sail plane and which is disposed between the sail and an end section that extends parallel to the sail plane. The displacing webs comprise a C-shaped cross section and the end section of each guiding profile is slidably captured in one of the C-shaped cross sections of one of the displacing webs.

In an embodiment, the sail comprises two plies and forms a pocket between the two plies. The adjustable sail part is extendable in the first adjusting direction where the adjustable sail part is pushed into the pocket and in the second adjusting direction where the adjustable sail part is retracted from the pocket.

In an embodiment, the guiding profiles and displacing webs are fabricated from plastic. The sail and the adjustable sail part are heat bonded or welded to the guiding profiles and displacing webs respectively.

In an embodiment, the adjustable sail part may be locked into an inward position and into an outward position by a releasable locking mechanism.

In an embodiment, the releasable locking mechanism comprises snap-in elements attached to the guiding profiles and displacing webs.

In an embodiment, the guiding profiles comprise rear ends. The releasable locking mechanism comprises manually adjustable clamping elements which are attached to the rear ends of the guiding profiles.

In an embodiment, the sail comprises two plies, folded front edge, two rear edges (one for each ply) and a clew. The sail defines a pocket between the two plies. The front edge of the sail is connected to the mast. The clew of the sail is connected to the boom. The boom is bifurcated or, includes two rearwardly extending legs, an extends along each ply of the sail. The sail defines a sail plane having a total area. The rear edges of the sail are connected to at least one adjustable sail part which is adjustable in the sail plane in one of two directions by adjusting the longitudinal position of the sail part in a first adjusting direction substantially parallel to the boom and towards the mast wherein the adjustable sail part moves into the pocket defined by the two plies of the sail in the area of the sail is decreased and, by adjusting the lateral position of the adjustable sail part in a second adjusting direction substantially parallel to the boom and away from the mast wherein the adjustable sail part is retracted from the pocket and the area of the sail plane is increased.

In an embodiment, the plies of the sail are connected by a plurality of guiding profiles disposed parallel to each other [and the boom] and which extend along the plies of the sail in the adjusting direction. The adjustable sail part comprises a plurality of displacing webs disposed parallel to each other [and the boom] and extend along the adjustable sail part. The guiding profiles serving as sail laths; each displacing web being accommodated in one guiding profile of each ply thereby connecting the two plies together.

Other objects and advantages of the present invention will become apparent upon reading the following detailed description and appended claims, and upon reference to the accompanying drawings.

Preferred embodiments of the guiding profile and the displacing webs guided therein are stated in the claims 5, 6 and 7. The embodiments described there at the one hand provide a low weight of the guiding profiles and displacing webs, and at the other hand a high stability.

In order to exclude that between the stationary parts of the sail and the adjustable sail part slots are formed which let the wind pass with the slots decreasing the effect of the sail as far as the propulsion of the vehicle is concerned it is provided that the sail at least in an area wherein the displaceable sail part is positioned with minimal sail area is designed double ply in form of a pocket wherein the displaceable sail part may be pushed into this pocket, and retracted from this pocket.

To attain a weight of the sail as low as possible, and for simultaneously guaranteeing high stability and rigidity it is proposed that the guiding profiles and the displacing webs are manufactured of plastic material, and that the sail cloth of the stationary part of the sail is connected with the guiding profiles, and the sail cloth of the displaceable part of the sail is connected with the displacing webs, preferably bonded or welded.

To enable the adjustment of the displaceable sail part with as little effort as possible, and simultaneously to exclude a non-required displacement of the displaceable sail part it is provided that the displaceable sail part at least in its two end positions in relation to the remaining sail is to be secured by means of releasable locking means.

The locking means mentioned above e.g. may be cooperating snap-in elements at the guiding profiles and displacing webs, and eventually at the parts of the boom displaceable in longitudinal direction towards each other, or alternately may be manually adjustable clamping or locking elements which are arranged at the guiding profiles preferably at the ends facing the free edge of the sail, and eventually at the displaceable parts of the boom to be displaced in relation to each other in longitudinal direction.

BRIEF DESCRIPTION OF THE FIGURES

Embodiments of the invention in the following are explained referring to a drawing, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
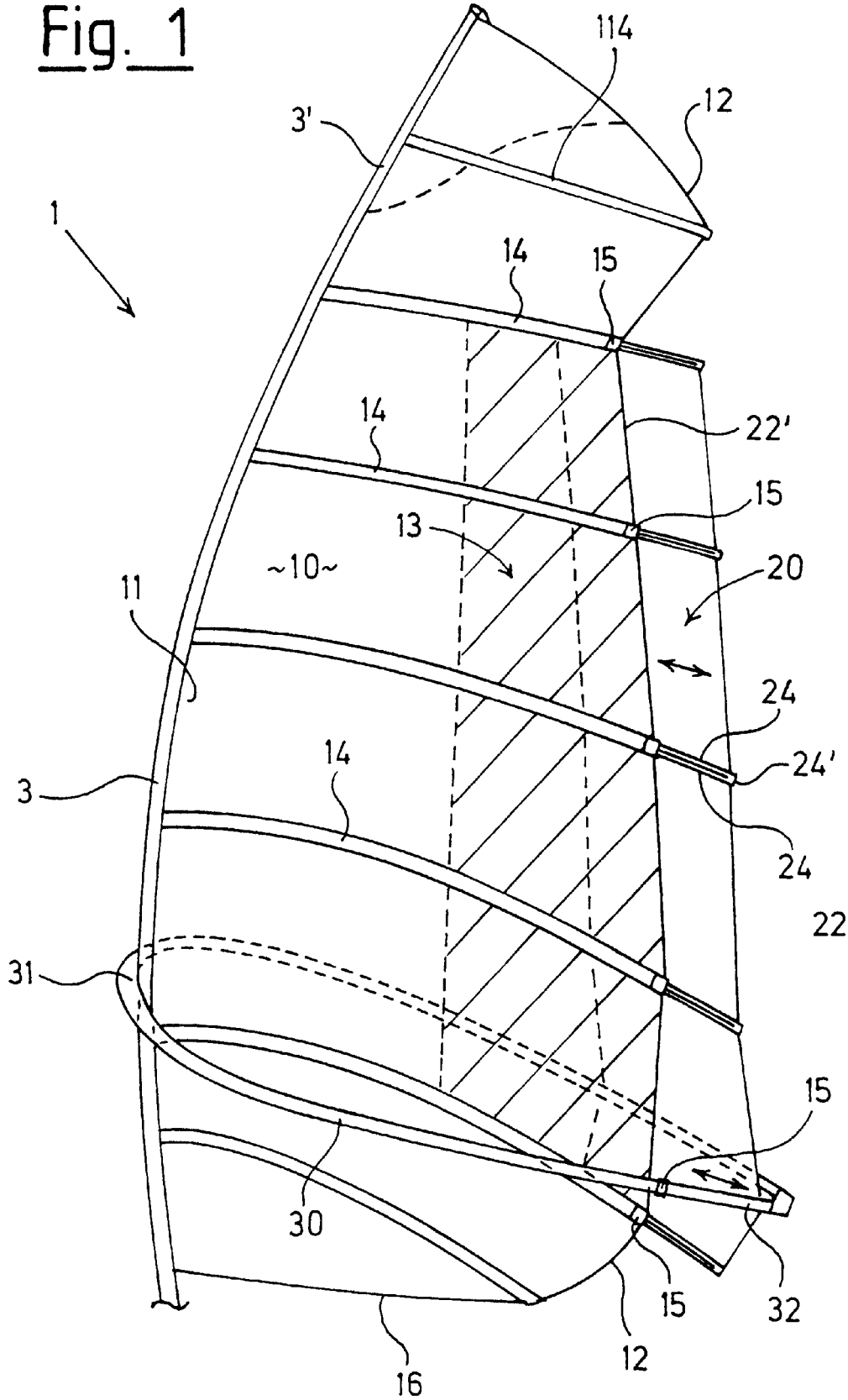
FIG. 1 is a plan view of a sail with a displaceable sail part made in accordance with the present invention.

The sail 1 illustrated in in FIG. 1 in the present embodiment is designed as a sail for a surfboard. With the front edge 11 pointing to the left in the Figure the sail 1 is connected to a mast 3 in a common fashion with the mast in its lower end not visible here articulatedly connected with an associated surfboard. Furthermore the sail 1 comprises a bifurcate boom 30 as it is usual for surfboard sails.

In contrast to common sails, the illustrated sail 1 comprises a sail part 20 which is displaceable in relation to a stationary sail part 10. In the FIG. 1 the displaceable sail part 20 is illustrated in its exposed position wherein the sail 1 comprises its maximal sail area.

In the position illustrated in FIG. 1, the displaceable sail part 20 may be pushed towards the mast 3 i.e. to the left in FIG. 1. Hereby the free edge 22 of the sail 1 facing away from the mast 3 is displaced to the left. When the displaceable sail part 20 has been pushed in as far as possible the edge 22', it forms the free edge of the sail 1 facing away from the mast 3. In this way the sail area of the sail 1 may be increased or decreased as required in order to adapt it to the wind conditions met. In this way the sail 1 may replace two or more common sails with a fixed sail area.

In order to enable the required displacement of the displaceable sail part 20, the sail 1 is provided with several guiding profiles 14 which simultaneously serve as sail laths and which extend in parallel with each other substantially perpendicular to the free edge 22 of the sail 1, and in parallel with the bifurcate boom 30. The guiding profiles 14 each are positioned with the one end (left in the Figure) at the mast 3, and with their other end, with the exception of the lower profile 14, reach to the free edge 22' of the sail 1. Therein the firm sail part 10 is secured with the guiding profiles 14, e.g. bonded or welded.

The displaceable sail part 20 comprises a pair of displacing webs 24 for each guiding profile 14 with the displacing webs being aligned with the guiding profiles 14 and guided in an axially displaceable fashion in the guiding profiles. The displacing webs 24 of each pair of displacing webs are connected with each other at their outer ends 24' which face the free edge 22. The displaceable sail part 20 as such is connected with the displacing webs 24, e.g. bonded or welded. The bifurcate boom 30 is also variable in length in its end area 32 facing away from the mast, and it is telescopic.

The fixed sail part 10 is made double ply in form of a pocket 13 in the area in FIG. 1 which is hatched in thin lines. This pocket 13 is open towards the free edge 22', and the displaceable sail part [22] *20* may be pushed into this pocket 13, and retracted out of this pocket 13. Wind open slots between the fixed sail part 10 and the displaceable sail part 20 thereby are avoided to the utmost degree such that the sail 1 when used performs like an integrated sail independent from the present position of the displaceable sail part 20.

As it is illustrated in FIG. 1 the displaceable sail part 20 in the illustrated embodiment of the sail 1 extends across a part of the sail 1 above and below the bifurcate boom 30.

In its upper area, i.e. the top of the seal 10 is provided with a sail part of unchangeable size wherein this upper sail part is stiffened by a fixed sail lath 114 which is not variable in length. The mast 3 in its upper end area 3' comprises an enlarged flexibility, i.e. a so called flex dynamic. The sail 1 in its upper sail area is provided with a so called twist dynamic corresponding to the flex dynamic of the upper mast area 3', with the twist dynamic offering an automatic reduction of the sail area at sudden gust force winds wherein the mast end area 3' is flexibly bent thereby reducing also the upper sail area beyond the upper guiding profile 14. This flex dynamic of the mast end area 3', and the twist dynamic of the upper sail area are advantageously not influenced by the adjustable sail part 20.

As an alternative the sail 1 may be designed such that the displaceable sail part 20 extends only across the sail area above the bifurcate boom 30. As a further alternative the sail 1 may comprise two separate displaceable sail parts 20, wherein preferably the one displaceable sail part is positioned above the bifurcate boom 30, and the second displaceable sail part is positioned below the bifurcate boom 30. In the alternate embodiments there is a stationary position of the connection of the end of the bifurcate boom 30 facing away from the mast with the [free edge] *clew* 12 [or the clew] of the sail 1, respectively, so that a bifurcate boom 30 with a firm length may be used. In all embodiments of the sail 1 relatively large variations of the sail area are enabled with small displacing distances such that with the sail 1 at least two or even more common sails with a firm sail area may be replaced.

For setting the displaceable sail part 20 in required displacing positions, at the guiding profiles 14 at the end facing the free edge 22', releasable locking means 15 are provided which prevent a non-required movement of the displacing webs 24 within the guiding profile 14. In case an adjustment of the displaceable sail part 20 is required, the locking means 15 are released or loosened for a while, and after the adjustment of the displaceable sail part 20 brought back to their locking position. Also the bifurcate boom 30 in the present example comprises such locking means 15.

As it is obvious from FIG. 1, the free edge 22 of the displaceable sail part 20 when pulled out is stiffened by the displacing webs 24 serving here as sailing laths. Furthermore when the displaceable sail part 20 is completely pushed in there is a uniform extension of the free edge [12] *22* of the firm sail part 10 such that inefficient edge areas tending to flap are avoided independent from the present position of the displaceable sail part 20.

Figure 2:
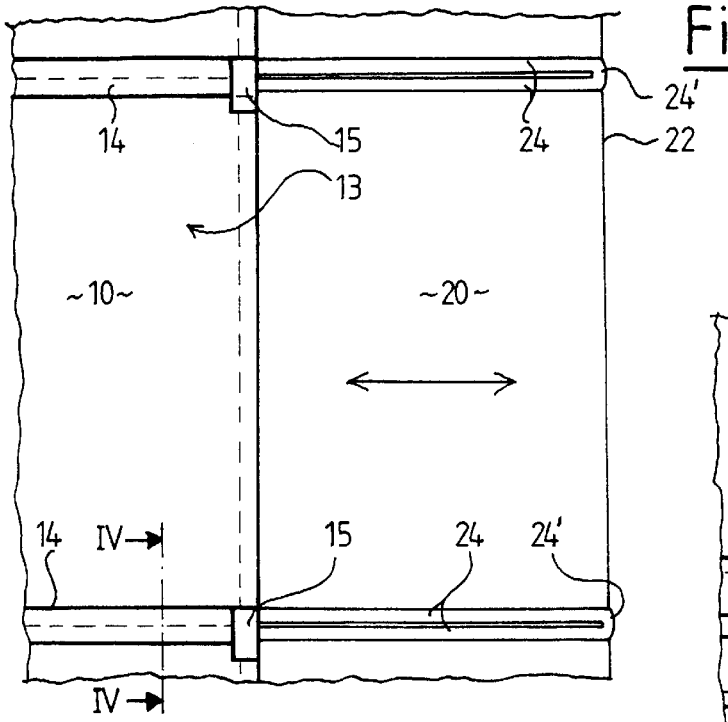
FIG. 2 is a partial enlarged view of the sail shown in FIG. 1.

FIG. 2 of the drawing illustrates in an enlarged scale a section of the displaceable sail part 20 together with a section of the firm sail part 10. Corresponding with the double arrow in the displaceable sail part 20, the sail part 20 may be displaced to the left or to the right wherein in FIG. 2 the maximal pulled out position of the displaceable sale part 20 is illustrated. By displacing the displaceable sail part 20 towards the left the latter is increasingly pushed into the firm sail part 10 which in this area is designed as a pocket 13 wherein the guiding of the two sail parts 10, 20 relative to each other is attained by the guiding profiles 14 and the displacing webs 24 guided therein. At the directly adjacent free end 24' the displacing webs 24 are connected with each other to guarantee a sufficient connection of the displaceable sail part 20.

Figure 3:
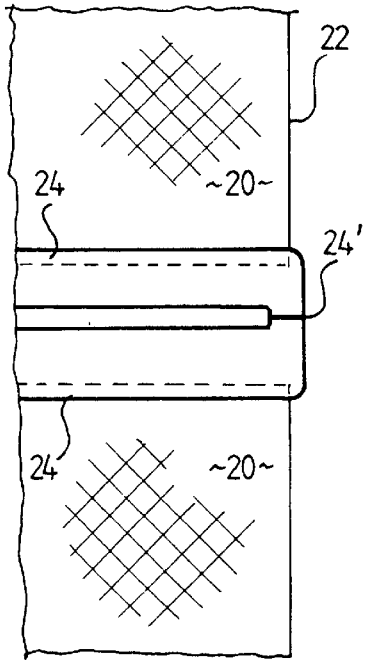
FIG. 3 is a further partial enlarged view of the sail shown in FIG. 1.

This embodiment of the displacing webs 24 with the connected free ends 24' again is illustrated in FIG. 3 in an enlarged scale.

Figure 4:
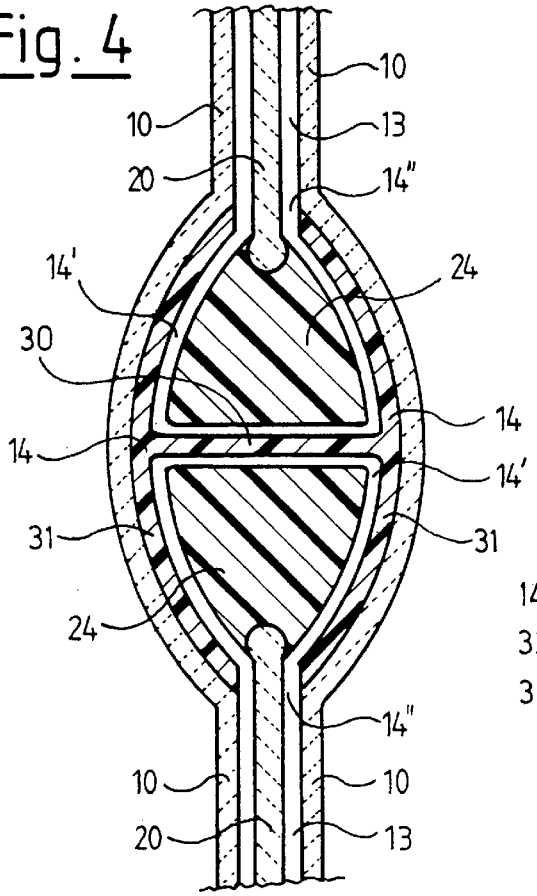
FIG. 4 is a sectional view taken substantially along line IV—IV of FIG. 2.

FIG. 4 of the drawing illustrates in a cross-section along the line IV—IV a possible embodiment of the guiding profile 14 and the displacing webs 24. In contrast to FIG. 2, in FIG. 4, the displaceable sail part 20 has been pushed into the pocket 13 of the firm sail part 10 such that in FIG. 4 also the displaceable sail part 20 is visible.

As it is obvious in the drawing the illustrated guiding profile 14 in principle comprises the form of a double T with the cross beam 30 disposed between end sections 31 which are bent towards each other, however, leaving a longitudinal slot 14" free between their ends. In this way two parallel guiding passages 14' are formed wherein each a displacing web 24 is guided. The displacing webs 24 in the form of their cross-sections are adapted to the cross-section of the guiding passages 14', and are made smaller than specified to enable an easy displacement.

The two plies of the firm sail part are connected, preferably bonded or welded with the outer side of the T-cross beam of the guiding profile 14. The displacement sail part 20 in the interior of the pocket 13 is connected with the displacing webs 24 wherein the edge of the sail part 20 facing the displacing web 24 is positioned inside the displacing web 24 and secured there wherein preferably a bonding or welding is applied.

The guiding profile 14 as well as the displacing webs 24 preferably consist of plastic material to attain a light weight, a high stability, and a certain flexibility.

Figure 5:
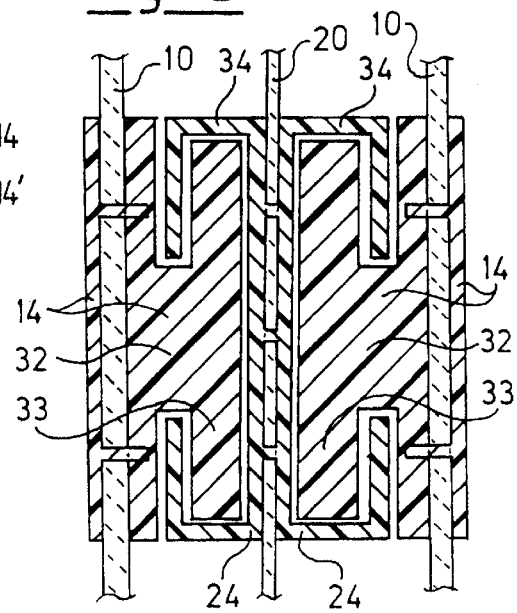
FIG. 5 is a cross sectional view of an alternative embodiment.

Finally FIG. 5 illustrates in the same way as FIG. 4 a changed embodiment of the guiding profile 14 and the associated displacing webs 24. At the left and right side in FIG. 5 two sections of the firm sail part 10 are visible extending in vertical direction wherein the firm sail part 10 is made double ply for forming the pocket 13 which has been described referring to FIG. 1 and 2. A guiding profile 14 is connected with each sail part 10 with the guiding profile 14 having a substantial T-shaped cross-section wherein in the present embodiment also the base of the T is enlarged to guarantee an enlarged connection area with the sail part 10. In symmetric arrangement an identical guiding profile 14 is arranged at the sail part 10 being right in FIG. 5 such that the T-cross beams of the two guiding profiles 14 are directed to each other and extend in parallel with each other. Similar to the embodiment shown in FIG. 5, the T-cross beam comprises a cross beam 32 disposed between a sail ply 10 and an end section 33 which is captured in the C-shaped cross section 34 of the displacing web 24. The displacing webs 24 are disposed on opposing surfaces of the adjustable sail part 20 and the guiding profiles 14 are disposed on the inside surfaces of the sail plies 10 so that the arrangement shown in FIG. 5 effectively attaches the sail plies 10 together like the arrangement shown in FIG. 4.

In the middle between the two sail parts 10 there is the displaceable sail part 20 with only a section of it being visible. At both sides of the adjustable sail part 20 a displacing web 24 with a C-shaped cross-section is arranged wherein the two displacing webs 24 are positioned back to back. The two displacing webs 24 receive the displaceable sail part 20 between them, and are connected with each other thereby.

Each C-shaped displacing webs 24 grips around one of the T-cross beams of the guiding profile 14 and leaves sufficient clearance for movement. In this way the displacing webs 24 with the adjustable seal part 20 fastened thereto are displaceable in axial direction of the guiding profile 14 relative to the guiding profile. A relative movement in cross direction to the displacing direction is prevented by the form of the guiding profile 14 and the displacing web 24.

From the above description, it is apparent that the object of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. A sail assembly comprising:

a mast, a sail comprising a front edge, a rear edge and a clew, the front edge of the sail being connected to the mast, the clew of the sail being connected to a boom, the boom being connected to the mast, the sail defining a sail plane having an area, the rear edge of the sail comprising at least one adjustable sail part which is adjustable in the sail plane of the sail by adjusting the [longitudinal] *lateral* position of the adjustable sail part in a first adjusting direction substantially parallel to the boom and towards the mast wherein the area of the sail plane is decreased and by adjusting the [longitudinal] *lateral* position of the adjustable sail part in a second adjusting direction substantially parallel to the boom and away from the mast wherein the area of the sail plane is increased, the sail further comprising a plurality of guiding profiles disposed parallel to each other and the boom and extending along the sail in the adjusting directions, the adjustable sail part comprising a plurality of displacing webs disposed parallel to each other and the boom and extending along the adjustable sail part in the adjusting directions, the guiding profiles serving as sail laths each guiding profile accommodating at least one displacing web.

2. The sail assembly of claim 1 wherein the boom comprises an extendable rear end for increasing a length of the boom along the second adjusting direction.

3. The sail assembly of claim 1 wherein the sail further comprises an upper end area, the upper end area of the sail comprising at least one sail lath, the plurality of guiding profiles further comprising an uppermost guiding profile disposed below the sail lath of the upper end area and below the upper end area, the adjustable sail part extending upwards to the uppermost guiding profile.

4. The sail assembly of claim 1 wherein each guiding profile accommodates two displacing webs, each guiding profile comprises cross beam disposed between two opposing end sections, the cross beam being disposed generally perpendicular to the sail plane and to the end sections, the end sections being bent towards each other and forming two profiled longitudinal slots with the cross beam disposed therebetween, each profiled longitudinal slot accommodating one of the displacing webs of the adjustable sail part.

5. The sail assembly of claim 4 wherein the adjustable sail part comprises a rear edge, and the displacing webs of the adjustable sail part are arranged in pairs, each pair of displacing webs being accommodated in one of the guiding profiles on opposing sides of the cross beam, each pair of displacing webs being connected to one another at the rear edge of the adjustable sail part.

6. The sail assembly of claim 1 wherein the guiding profiles comprise a T-shaped cross section with a cross beam that extends perpendicular to the sail plane, the cross beam of each guiding profile being disposed between the sail and an end section that extends parallel to the sail plane, and the displacing webs comprising a C-shaped cross-section, the end section of each guiding profile being slidably captured in one of the C-shaped cross sections of one of the displacing webs.

7. The sail assembly of claim 1 wherein the sail comprises two plies and forms a pocket, the adjustable sail part being extendable in the first adjusting direction where the adjustable sail part is pushed into the pocket and in the second adjusting direction where the adjustable sail part is retracted from the pocket.

8. The sail assembly of claim 1 wherein the guiding profiles and the displacing webs are fabricated from plastic, wherein the sail and the adjustable sail part are bonded or welded to the guiding profiles and displacing webs respectively.

9. The sail assembly of claim 1 wherein the adjustable sail part may be locked into an inward position and an outward position by a releasable locking mechanism.

10. The sail assembly of claim 9 wherein the releasable locking mechanism comprises cooperating snap-in elements attached to the guiding profiles and the displacing webs.

11. The sail assembly of claim 9 wherein the guiding profiles comprise rear ends, the releasable locking mechanism comprises manually adjustable clamping elements which are attached to the rear ends of the guiding profiles.

12. A sail assembly comprising:

a mast, a sail comprising two plies, a folded front edge, two rear edges and a clew, the sail defining a pocket between the two plies, the front edge of the sail being connected to the mast, the clew of the sail being connected to a boom, the boom being bifurcated and extending along each ply of the sail, the boom being connected to the mast, the sail defining a sail plane having a total area, the rear edges of the sail being connected *to* at least one adjustable sail part which is adjustable in the sail plane of the sail by adjusting the [longitudinal] *lateral* position of the adjustable sail part in a first adjusting direction substantially parallel to the boom and towards the mast wherein the adjustable sail part moves into the pocket defined by the sail and the area of the sail plane is decreased, and by adjusting the [longitudinal] *lateral* position of the adjustable sail part in a second adjusting direction substantially parallel to the boom and away from the mast wherein the adjustable sail part is retracted from the pocket and the area of the sail plane is increased, the plies of the sail further comprising a plurality of guiding profiles disposed parallel to each other and the boom and which extend along inside surfaces of the plies of the sail, the adjustable sail part comprising a plurality of displacing webs disposed parallel to each other and on opposing surfaces of the adjustable sail part and parallel to the boom, the guiding profiles serving as sail laths, each displacing web being accommodated in one guiding profile of each ply.

13. The sail assembly of claim 12 wherein the boom comprises at least one extendable rear end for increasing a length of the boom along the second adjusting direction.

14. The sail assembly of claim 12 wherein the sail further comprises an upper end area, the upper end area of the sail comprising at least one sail lath, the plurality of guiding profiles further comprising two uppermost guiding profiles, one uppermost guiding profile disposed on each ply, both of the uppermost guiding profiles being disposed below the sail lath of the upper end area and below the upper end area, the adjustable sail part extending upwards to the uppermost guiding profiles but below the sail lath of the upper end area.

15. The sail assembly of claim 12 wherein each guiding profile accommodates two displacing webs, each guiding profile comprises cross beam disposed between two opposing end sections, the cross beam being disposed generally perpendicular to the sail plane and to the end sections, the end sections being bent towards each other and forming two profiled longitudinal slots with the cross beam disposed therebetween, each profiled longitudinal slot accommodating one of the displacing webs of the adjustable sail part.

16. The sail assembly of claim 15 wherein the adjustable sail part comprises a rear edge, and the displacing webs of the adjustable sail part are arranged in pairs, each pair of displacing webs being accommodated in one of the guiding profiles on opposing sides of the cross beam, each pair of displacing webs being connected to one another at the rear edge of the adjustable sail part.

17. The sail assembly of claim 12 wherein the guiding profiles comprise a T-shaped cross section with a cross beam that extends perpendicular to the sail plane, the cross beam of each guiding profile being disposed between one of the sail plies and an end section that extends parallel to the sail plane, and the displacing webs comprising two opposing C-shaped cross sections, the end section of each guiding profile being slidably captured in one of the C-shaped cross sections of one of the displacing webs.

18. The sail assembly of claim 12 wherein the adjustable sail part may be locked into an inward position and an outward position by a releasable locking mechanism.

*19. A sail assembly, comprising:*

*a mast,*

*a sail comprising a front edge, a rear edge and a clew, the front edge of the sail being connected to the mast, the clew of the sail being connected to a boom, the boom being connected to the mast, the sail defining a sail plane having an area,*

*the rear edge of the sail comprising at least one adjustable sail part which is adjustable in the sail plane of the sail by adjusting the lateral position of the adjustable sail part in a first adjusting direction towards the mast wherein the area of the sail plane is decreased and by adjusting the lateral position of the adjustable sail part in a second adjusting direction away from the mast wherein the area of the sail plane is increased,*

*the sail further comprising a plurality of guiding profiles disposed parallel to each other and extending along the sail in the adjusting directions,*

*the adjustable sail part comprising a plurality of displacing webs disposed parallel to each other and extending along the adjustable sail part in the adjusting directions,*

*the displacing webs each being aligned with a guiding profile and guided in an axially displaceable fashion in the guiding profiles,*

*the guiding profiles serving as sail laths wherein each guiding profile accommodates at least one displacing web.*

*20. The sail assembly of claim 19, wherein the boom comprises an extendable rear end for increasing a length of the boom along the second adjusting direction.*

*21. The sail assembly of claim 19, wherein the sail further comprises an upper end area, the upper end area of the sail comprising at least one sail lath, the plurality of guiding profiles further comprising an uppermost guiding profile disposed below the sail lath of the upper end area and below the upper end area, the adjustable sail part extending upwards to the uppermost guiding profile.*

*22. The assembly of claim 19, wherein each guiding profile accommodates two displacing webs, each guiding profile comprises a cross beam disposed between two opposing end sections, the cross beam being disposed generally perpendicular to the sail plane and to the end sections, the end sections being bent towards each other and forming two profiled longitudinal slots with the cross beam disposed therebetween, each profiled longitudinal slot accommodating one of the displacing webs of the adjustable sail part.*

*23. The sail assembly of claim 22, wherein the adjustable sail part comprises a rear edge, and the displacing webs of the adjustable sail part are arranged in pairs, each pair of displacing webs being accommodated in one of the guiding profiles on opposing sides of the cross beam, each pair of displacing webs being connected to one another at the rear edge of the adjustable sail part.*

*24. The sail assembly of claim 19, wherein the guiding profiles comprise a T-shaped cross section with a cross beam that extends perpendicular to the sail plane, the cross beam of each guiding profile being disposed between the sail and an end section that extends parallel to the sail plane, and the displacing webs comprising a C-shaped cross section, the end section of each guiding profile being slidably captured in one of the C-shaped cross sections of one of the displacing webs.*

*25. The sail assembly of claim 19, wherein the sail comprises two plies and forms a pocket, the adjustable sail part being extendable in the first adjusting direction where the adjustable sail part is pushed into the pocket and in the second adjusting direction where the adjustable sail part is retracted from the pocket.*

*26. The sail assembly of claim 19, wherein the guiding profiles and the displacing webs are fabricated from plastic, wherein the sail and the adjustable sail part are bonded or welded to the guiding profiles and displacing webs respectively.*

*27. The sail assembly of claim 19, wherein the adjustable sail part may be locked into an inward position and an outward position by a releasable locking mechanism.*

*28. The sail assembly of claim 27, wherein the releasable locking mechanism comprises cooperating snap-in elements attached to the guiding profiles and the displacing webs.*

*29. The sail assembly of claim 27, wherein the guiding profiles comprise rear ends, the releasable locking mechanism comprises manually adjustable clamping elements which are attached to the rear ends of the guiding profiles.*

*30. A sail assembly, comprising:*

*a mast,*

*a sail comprising two plies, a folded front edge, two rear edges and a clew, the sail defining a pocket between the two plies, the front edge of the sail being connected to the mast, the clew of the sail being connected to a boom, the boom being bifurcated and extending along each ply of the sail, the boom being connected to the mast, the sail defining a sail plane having a total area,*

*the rear edges of the sail being connected to at least one adjustable sail part which is adjustable in the sail plane by adjusting the lateral position of the adjustable sail part in a first adjusting direction towards the mast wherein the adjustable sail part moves into the pocket defined by the sail and the area of the sail plane is decreased, and by adjusting the lateral position of the adjustable sail part in a second adjusting direction away from the mast wherein the adjustable sail part is retracted from the pocket and the area of the sail plane is increased,*

*the plies of the sail further comprising a plurality of guiding profiles disposed parallel to each other and the adjusting directions and which extend along inside surfaces of the plies of the sail,*

*the adjustable sail part comprising a plurality of displacing webs disposed parallel to each other and on opposing surfaces of the adjustable sail part,*

*the guiding profiles serving as sail laths, each displacing web being accommodated in one guiding profile of each ply.*

*31. The sail assembly of claim 30, wherein the boom comprises at least one extendable rear end for increasing a length of the boom along the second adjusting direction.*

*32. The sail assembly of claim 30, wherein the sail further comprises an upper end area, the upper end area of the sail comprising at least one sail lath, the plurality of guiding profiles further comprising two uppermost guiding profiles, one uppermost guiding profile disposed on each ply, both of the uppermost guiding profiles being disposed below the sail lath of the upper end area and below the upper end area, the adjustable sail part extending upwards to the uppermost guiding profiles but below the sail lath of the upper end area.*

*33. The sail assembly of claim 30, wherein each guiding profile accommodates two displacing webs, each guiding profile comprises cross beam disposed between two opposing end sections, the cross beam being disposed generally perpendicular to the sail plane and to the end sections, the end sections being bent towards each other and forming two profiled longitudinal slots with the cross beam disposed therebetween, each profiled longitudinal slot accommodating one of the displacing webs of the adjustable sail part.*

*34. The sail assembly of claim 33, wherein the adjustable sail part comprises a rear edge, and the displacing webs of the adjustable sail parts are arranged in pairs, each part of displacing webs being accommodated in one of the guiding profiles on opposing sides of the cross beam, each pair of displacing webs being connected to one another at the rear edge of the adjustable sail part.*

*35. The sail assembly of claim 30, wherein the guiding profiles comprise a T-shaped cross section with a cross beam that extends perpendicular to the sail plane, the cross beam of each guiding profile being disposed between one of the sail plies and an end section that extends parallel to the sail plane, and the displacing webs comprising two opposing C-shaped cross sections, the end section of each guiding profile being slidably captured in one of the C-shaped cross sections of one of the displacing webs.*

*36. The sail assembly of claim 30, wherein the adjustable sail part may be locked into an inward position and an outward position by a releasable locking mechanism.*

* * * * *